United States Patent [19]

Lehtinen

[11] 4,035,027

[45] July 12, 1977

[54] EMERGENCY WHEEL

[76] Inventor: John G. Lehtinen, 621 Lochaven, Union Lake, Mich. 48085

[21] Appl. No.: 633,950

[22] Filed: Nov. 20, 1975

Related U.S. Application Data

[63] Continuation-in-part of Ser. No. 518,991, Oct. 29, 1974, abandoned.

[51] Int. Cl.² .................................... B60B 11/00
[52] U.S. Cl. ........................................ 301/38 R
[58] Field of Search ............ 301/38 R, 38 S, 39 R, 301/39 T, 40 R, 40 S, 36 R

[56] References Cited

U.S. PATENT DOCUMENTS

| | | | |
|---|---|---|---|
| 3,083,063 | 3/1963 | Alfsen | 301/38 R |
| 3,295,894 | 1/1967 | Perry | 301/38 R |
| 3,608,970 | 9/1971 | Strumbos | 301/38 R |
| 3,653,718 | 4/1972 | Gellender | 301/38 R |
| 3,679,267 | 7/1972 | Zachmann | 301/38 R |

FOREIGN PATENT DOCUMENTS

| | | | |
|---|---|---|---|
| 940,061 | 10/1963 | United Kingdom | 301/38 R |

Primary Examiner—Stanley H. Tollberg
Assistant Examiner—Charles A. Marmor
Attorney, Agent, or Firm—Clarence A. O'Brien; Harvey B. Jacobson

[57] ABSTRACT

An emergency wheel is provided for use in conjunction with a vehicle wheel of the type including a recessed central portion mounted on a vehicle hub by fasteners secured through the central portion and supported from the hub. The emergency wheel defines a center axis thereof and includes a first portion having a plurality of large and small diameter openings formed therethrough spaced about and equally from the center axis with the openings being arranged in the conventional wheel lug pattern. A plurality of washers are provided for disposition over the large diameter openings and the latter are the size to receive conventional lug nuts or heads therethrough. A second portion is supported from the first portion for rotation relative thereto about the center axis and the first and second portions include radially outwardly projecting partial circular flange segments which, upon relative rotation of the first and second portions, are shiftable between first positions in registry with each other and second positions out of registry with each other forming a substantially continuous disc concentric with the center axis. Further, structure is provided for releasably locking the first and second portions in the second positions out of registry with each other to form the aforementioned disc.

11 Claims, 11 Drawing Figures

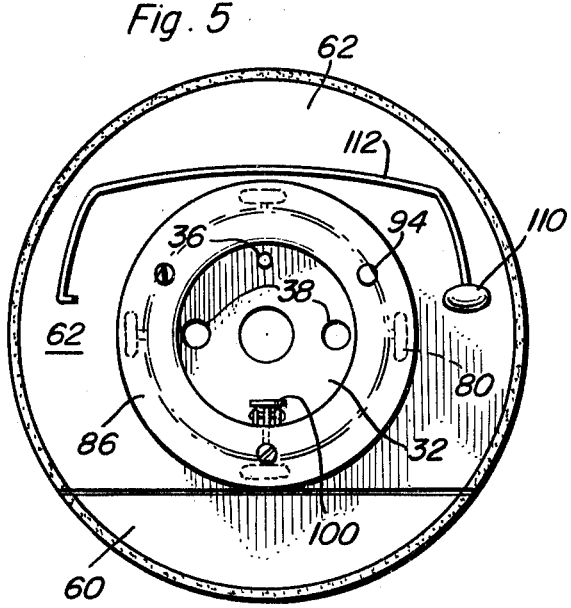
Fig. 5
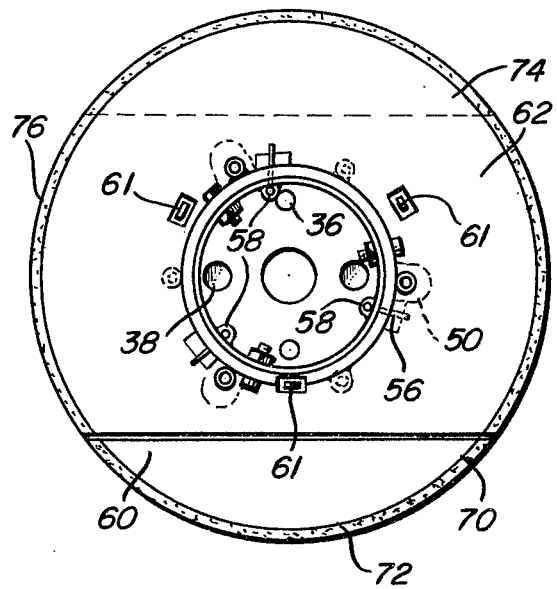
Fig. 6
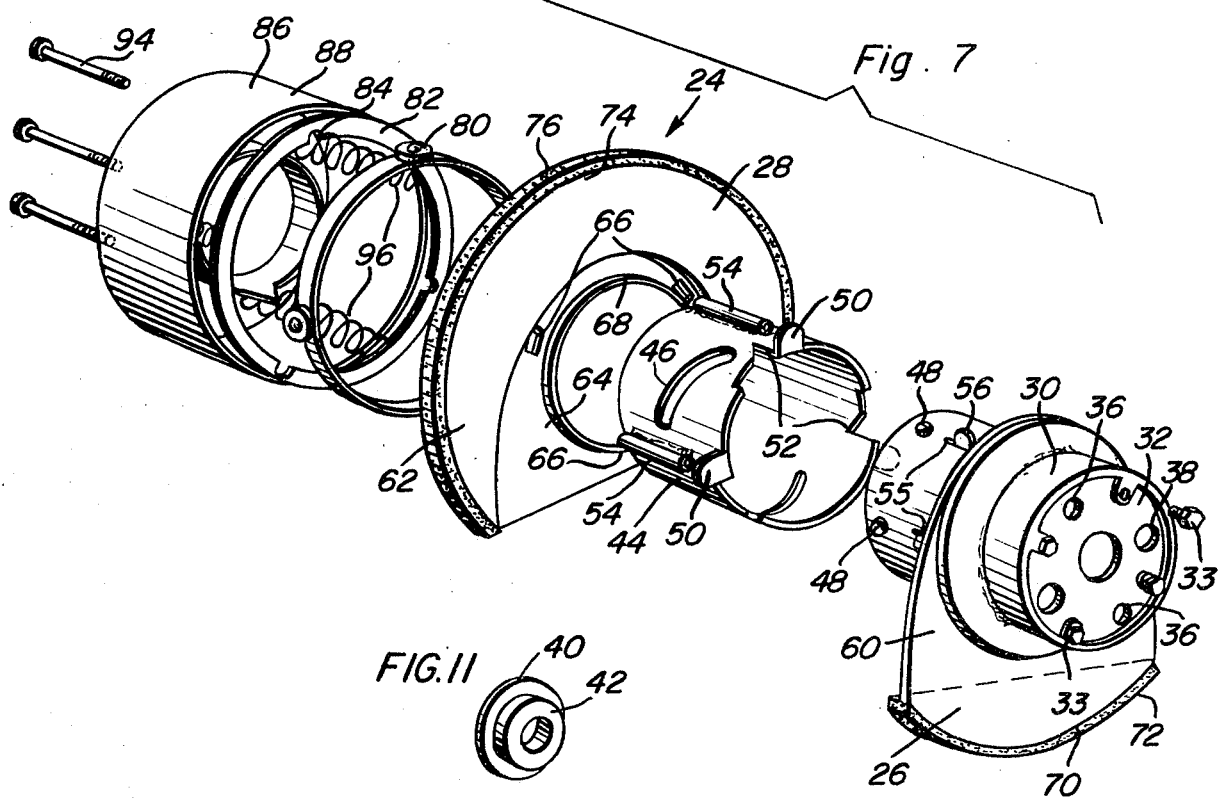
Fig. 7
FIG. 11

EMERGENCY WHEEL

This application comprises a continuation-in-part of my copending application Ser. No. 518,991, filed Oct. 29, 1974, for EMERGENCY WHEEL, now abandoned.

BACKGROUND OF THE INVENTION

Various forms of emergency wheels have been heretofore designed to provide a readily attachable wheel on the outer side of a vehicle wheel having a flat tire mounted thereon so as to enable the associated vehicle to be driven without repair or removal of the flat tire. In addition, various forms of supplemental wheels have been heretofore designed for the purpose of mounting on the outside of a conventional vehicle wheel having an inflated tire thereon, whereby the supplemental wheel may be utilized to provide additional traction. An example of one form of emergency wheel for use in conjunction with a vehicle wheel having a flat tire mounted thereon is disclosed in U.S. Pat. No. 3,644,001. However, this form of emergency wheel requires additional attaching lug nuts for a specially constructed wheel.

BRIEF DESCRIPTION OF THE INVENTION

The emergency wheel of the instant invention includes first and second portions rotatable relative to each other about a center axis and the first portion of the emergency wheel includes a central portion thereof for removable support from the central portion of a vehicle wheel having a deflated tire thereon. The central portion of the emergency wheel is equipped with lug bolt openings including large diameter openings and small diameter openings, the large diameter openings being adapted to receive conventional lug nuts or heads therethrough and shouldered washers being provided for utilization over the large diameter openings. The first and second relatively rotatable portions of the emergency wheel include first and second radially outwardly projecting partial circular flange segments, respectively, and the segments are relatively rotatable between first positions in registry with each other and second positions out of registry with each other together forming a substantially continuous disc concentric with the center axis of the emergency wheel, the latter being provided with structure for releasably locking the first and second portions thereof in the second positions thereof with the flange segments coacting to define a substantially continuous disc.

The first portion to be supported from the central portion of the associated vehicle wheel having a deflated tire thereon includes ramp surfaces extending outward to the opposite ends of the arcuate outer peripheral edge of the flange segment thereof whereby rolling movement of the flattened tire along the ground will bring one of the ramp surfaces into engagement with the ground and thus elevate the associated vehicle wheel until such time as the outer peripheral arcuate surface of the first flange segment rests upon the road surface.

The main object of this invention is to provide an emergency vehicle wheel which may be readily mounted on the exterior of an associated vehicle wheel having a flat tire thereon without jacking up the vehicle wheel by conventional means and with the emergency wheel capable of serving the operational function of the vehicle wheel when its tire is inflated.

Another object of this invention, in accordance with the immediately preceding object, is to provide an accessory wheel which may be readily mounted to the exterior of a conventional vehicle wheel and utilized to provide additional traction.

A still further object of this invention is to provide an emergency wheel which may be used in conjunction with a conventional vehicle wheel as a replacement therefor when the supportive bearings of that wheel have been damaged to the extent that they may no longer perform their intended function.

A final object of this invention to be specifically enumerated herein is to provide an emergency wheel in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an outer side elevational view of the emergency wheel;

FIG. 6 is a view similar to FIG. 5 but with the outer cover and spring biased follower for the axially shiftable portion of the emergency wheel removed;

FIG. 7 is an exploded perspective view of the emergency wheel;

FIG. 8 is a fragmentary perspective view illustrating a portion of the emergency wheel's controllable outer cover shifted mid-way its limit positions;

FIG. 9 is a framentary perspective view illustrating one of the retractable abutments by which the relatively rotatable and axially shiftable portions of the emergency wheel are retained against axial separation;

FIG. 10 is a fragmentary enlarged sectional view of the assemblage illustrated in FIG. 9; and FIG. 11 is a perspective view of one of a plurality of shouldered washers to be used in mounting the emergency wheel over a vehicle wheel.

DETAILED DESCRIPTION OF THE INVENTION

Figure 1:
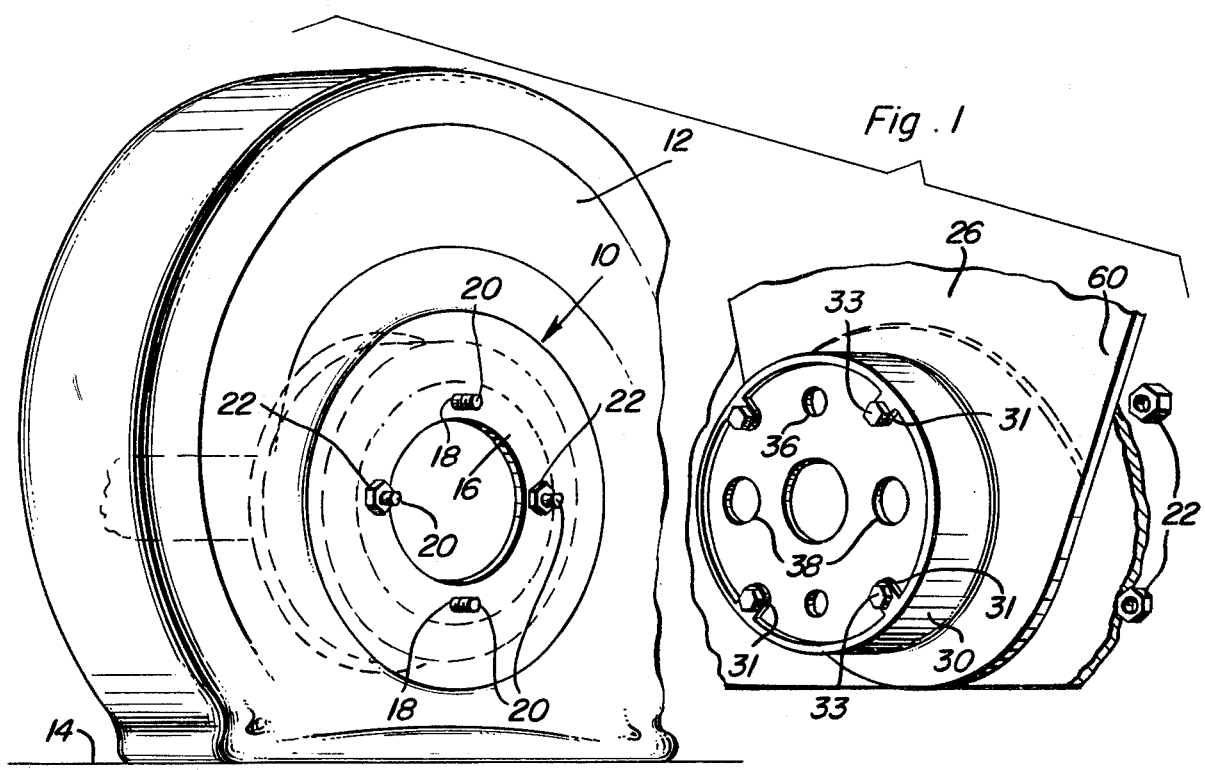
FIG. 1 is a perspective view of a conventional vehicle wheel having a deflated tire thereon and with two of the lug nuts of the conventional wheel removed, the central portion of the emergency wheel being fragmentarily illustrated in exploded position prior to application of the emergency wheel over the exterior of the conventional wheel.

Referring now more specifically to the drawings, the numeral 10 generally indicates a conventional vehicle wheel having a pneumatic tire 12 thereon. The tire 12 is in a deflated position and rests upon a suitable support surface 14 therefor.

The wheel 10 includes a central hub portion 16 having circumferentially spaced bores 18 formed therein for receiving threaded wheel mounting studs 20 (carried by an associated vehicle hub portion) therethrough. The wheel 10 is conventionally mounted in position on the studs 20 by means of threaded lug nuts 22.

The foregoing comprises a description of conventional vehicle wheel mounting structure.

The emergency wheel of the instant invention is referred to in general by the reference numeral 24 and includes first and second portions 26 and 28. The portion 26 includes a cylindrical body 30 having a disc-shaped hub 32 journaled in the outer end thereof by means of a bearing assembly 34. The hub 32 includes a pair of circumferentially spaced small diameter bores 36 and a pair of circumferentially spaced large diameter bores 38. The bores 36 are of a size to snugly receive the studs 20 therethrough and the bores 38 are of a size to receive the nuts 22 therethrough. A pair of shouldered washers 40 including diametrically reduced portions 42 snugly receivable in the bores 38 are also provided. The first portion 26 may be mounted on the wheel 10 by removing two diametrically opposite nuts 22 and thereafter positioning the first portion 26 so that the studs 20 from which the nuts have been removed are received through the bores 36 and the nuts remaining on the other studs are received through the bores 38. Then, the first removed nuts are reapplied over the studs 20 received through the bores 36. Thereafter, the other pair of lug nuts 22 are removed, the shouldered washers 40 have their diametrically reduced portions 42 positioned in the bores 38 after being applied to the studs 20 and the last removed pair of lug nuts 22 are thereafter reapplied to the corresponding studs 20 over the washers 40. In this manner, the emergency wheel 24 may be applied to the outer side of the wheel 10 without removing all of the nuts 22 at one time.

The second portion 28 includes a cylindrical body 44 rotatable and slidable on the end of the body 30 remote from the hub 32. The body 44 includes three peripherally spaced inclined slots 46 in which followers 48 spaced about the body 30 are slidably received. In addition, the inner end of the body 44 includes three peripherally spaced and radially outwardly projecting lugs 50 and three peripherally spaced notches 52, the notches 52 opening endwise outwardly of the body 44. Also, the body 44 includes three peripherally spaced internally threaded sleeves 54 extending longitudinally of its outer surface.

The body 30 includes three peripherally spaced longitudinal slots 55 and three locking tabs 56 pivotally supported from the inner surface of the body 30 as at 58, see FIGS. 6 and 7, with the locking tabs 56 projecting through the slots 55. The tabs 56 are swingable between substantially radially outwardly projecting positions and collapsed positions extending about the circumference of the body 30. When the tabs 56 are in their extended positions, they project through the notches 52 and when the body 44 is rotated in a counterclockwise direction as viewed in FIG. 7, the portions of the body 44 defining the notches 52 cam the locking tabs toward their retracted positions.

The body 30 includes a first radially outwardly projecting partial circular flange segment 60 and the inner periphery of the flange segment 60 includes three unequally peripherally spaced lugs 61 projecting axially of the body 30 away from the hub 32 and unequally spaced from the center axis of the hub 32.

The second portion 28 includes a disc 62 defining a second radially outwardly projecting partial circular flange segment mounted on the body 44 between the inner ends of the sleeves 54 and the lugs 50. The side of the disc or flange segment 62 opposing the lugs 50 is recessed as at 64 and provided with three unequally circumferentially spaced openings 66 spaced unequally outwardly of the central opening 68 in the disc 62 and in which the abutments or lugs 61 are receivable when the flange segments 60 and 62 are relatively rotated to predetermined positions thereof with the flange segment 60 registered with the recess 64. The flange segment 60 includes an arcuate outer periphery 70 having a rubber tread surface 72 secured thereover and the flange segment 62 includes a partial circular outer periphery 74 having a rubber tread surface 76 secured thereover.

When the flange segment 60 is registered with the recess 64 and the lugs 61 are registered with the openings 66, the disc 62 may be shifted inwardly along the body 44 whereby the lugs 61 will be received in the openings 66 and the flange segment 60 will be keyed in the recess 64. With the flange segments 60 and 62 thus keyed together the outer peripheries 70 and 74 define a substantially continuous circular outer periphery coaxial with the center axis of the hub 32.

The outer side of the flange segment 62 includes an annular outwardly an axially projecting dust shield 77 and a frame-like cage 78 is disposed about the body 44 inwardly of the shield 77 and has a plurality of wheels 80 journaled therefrom at points spaced peripherally thereabout.

A follower disc 82 provided with inner peripheral notches 84 is telescoped over the outer end of the body 44 with the notches 84 receiving the sleeves 54 therethrough. Thus, the disc 82 may be axially shifted relative to the body 44, but the engagement of the sleeves 54 and the notches 84 prevent rotation of the follower disc 82 relative to the body 44.

A cover assembly referred to in general by the reference numeral 86 is provided and includes an outer cylindrical wall 88, an inner cylindrical wall 90 and an outer annular wall 92 extending between and interconnecting the outer ends of the walls 88 and 90. A plurality of headed fasteners 94 are secured through peripherally spaced portions of the outer annular wall 92 and are threadedly engaged in the sleeves 54, a plurality of compression springs 96 being disposed between the inner surface of the outer annular wall 92 and the outer surface of the follower disc 82 and thereby yieldingly biasing the follower disc 82 inwardly against the wheels 80. Accordingly, the wheels 80 yieldingly bias the disc 62 axially along the body 44 toward the disc 60, but the engagement of the abutments or lugs 61 with the inner end of the recess 64 prevents the disc 62 from contacting the segment 60 until such time as the lugs 61 are registered with the opening 66 and the segment 60 is properly registered with the recess 64.

A spring biased latch assembly 100 is pivotally supported from the outer annular wall 92 and includes a latching portion 102 projectable into one of a pair of openings 104 and 106 formed in the body 30. When the body 44 is rotated to its limit position in a clockwise direction as viewed in FIG. 7 of the drawings, the followers 48 are seated in the outer ends of the slots 46 and the lugs 61 are registered with the openings 66.

Further, the springs 96 are compressed and therefore bias the disc 62 inwardly whereby the lugs 61 are received in the openings 66 and the segment 60 is keyed in the recess 64. At this time, the latch portion 102 is engaged in the opening 104. Further, as the cover assembly 87, and thus the body 44, are rotated to its limit position relative to the body 30 in a clockwise direction, the notches 52 are registered with the slots 55. However, the inner periphery of the disc 62 is registered with the free swinging ends of the locking tabs 56 and retain the latter in at least partially collapsed positions until such time as the biasing action of the springs 96 acting through the wheels 80 causes the disc 62 to be shifted inwardly to a position with the flange segment 60 seated in the recess 64 and the lugs 61 received in the openings 66. At this time, the locking tabs 56 are disposed on the outer side of the disc 62 and thus free to swing to their radially outwardly projecting extending positions locking the disc 62 against outward movement relative to the flange segment 60. However, when the cover assembly 86 and thus the body 44 are rotated in a counterclockwise direction to their limit positions defined by the inner ends of the slots 46, the body 44 cams the locking tabs 56 inwardly toward their retracted positions, the springs 96 are allowed to expand and the lugs 50 engage the inner side of the disc 62 within the recess 64 so as to axially shift the disc 62 away from the flange segment 60. In this position, the portion 102 of the latch assembly 100 is seated in the opening 106.

Figure 2:
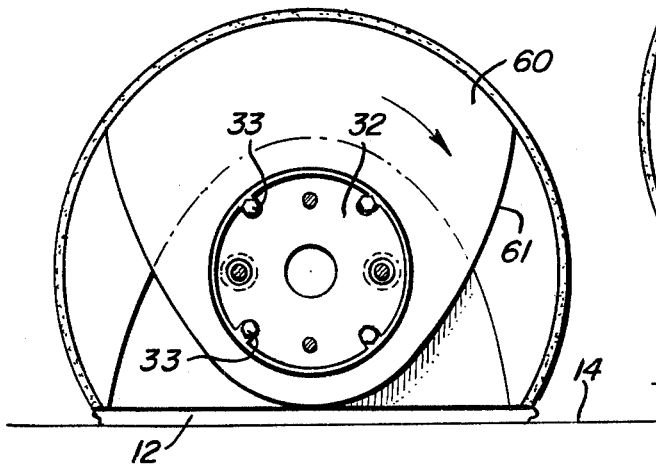
FIG. 2 is an inner side elevational view of the emergency wheel as initially applied to the associated vehicle wheel.

In operation, when the tire 12 experiences a puncture thus lowering the wheel 10 downwardly toward the ground 14, the hub 32 of the emergency wheel 24 is mounted on the studs 20 in the manner hereinbefore set forth with the flange segments 60 and 62 arranged in the manner illustrated in FIG. 2. Then, the outer cover assembly 86 and thus the body 44 are rotated to their limit positions of movement in a clockwise direction as viewed in FIG. 7 of the drawings and are secured in position by means of the latch portion 102 being received in the opening 106. Thereafter, a weight body 110 slidably mounted in a slot 112 formed in the outer side of the disc 62 is shifted from the left-hand end of the slot 112 to the right-hand end of the slot 112 as illustrated in FIG. 5 of the drawings. Then, the wheel 10, and thus the hub 32, are caused to rotate in a clockwise direction as illustrated in FIG. 2 of the drawings whereupon the leading ramp surface 61 of the flange segment 60 will roll into contact with the ground 14 and thereafter elevate the hub 32 to the position thereof illustrated in FIG. 3 of the drawings as a result of a 180° angular displacement of the hub 32 in a clockwise direction as viewed in FIGS. 2 and 3 from the position thereof illustrated in FIG. 2 to the position thereof illustrated in FIG. 3. At this point, the hub 32, and thus the wheel 10, are elevated relative to the ground 14 and that portion of the weight of the associated vehicle normally supported from the tire 12 is supported from the rubber tread surface 72 of the flange section 60. The weight 110 causes the disc 62 to be eccentrically weighted and to therefore resist rotation with the hub 32 and body 30 whereupon the lugs or abutments 61 will be registered with the openings 66 and the flange segment 60 will be registered with the recess 64 formed in the disc 62, thereby allowing the disc 62 to be axially shifted under the influence of the springs 96 and the wheels 80 along the body 44 to a position with the flange segment 60 keyed in the recess 64. At this point, the emergency wheel 24 defines a continuous circular outer periphery and may be utilized in lieu of the tire 12. Of course, the diameter of the emergency wheel 24 is to be equal to the diameter of the tire 12 when the later is inflated. Thus, when the tire 12 is deflated it is supported above the surface 14 and when the tire is inflated the tire 12 and the emergency wheel 24 provide traction in excess of that which can be provided by the tire 12 by itself.

Figure 3:
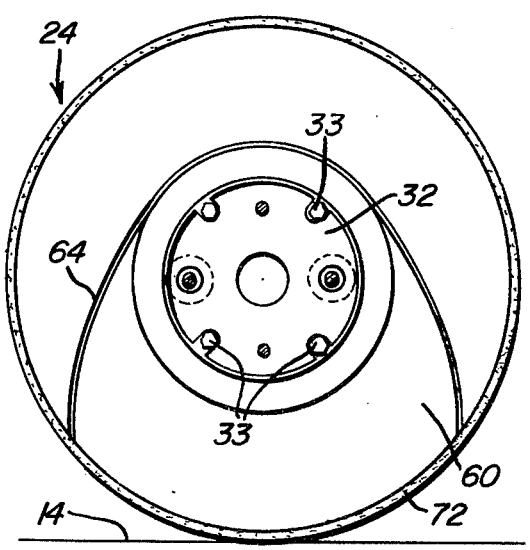
FIG. 3 is a view similar to FIG. 2 but with the emergency wheel in a fully operative condition.
Figure 4:
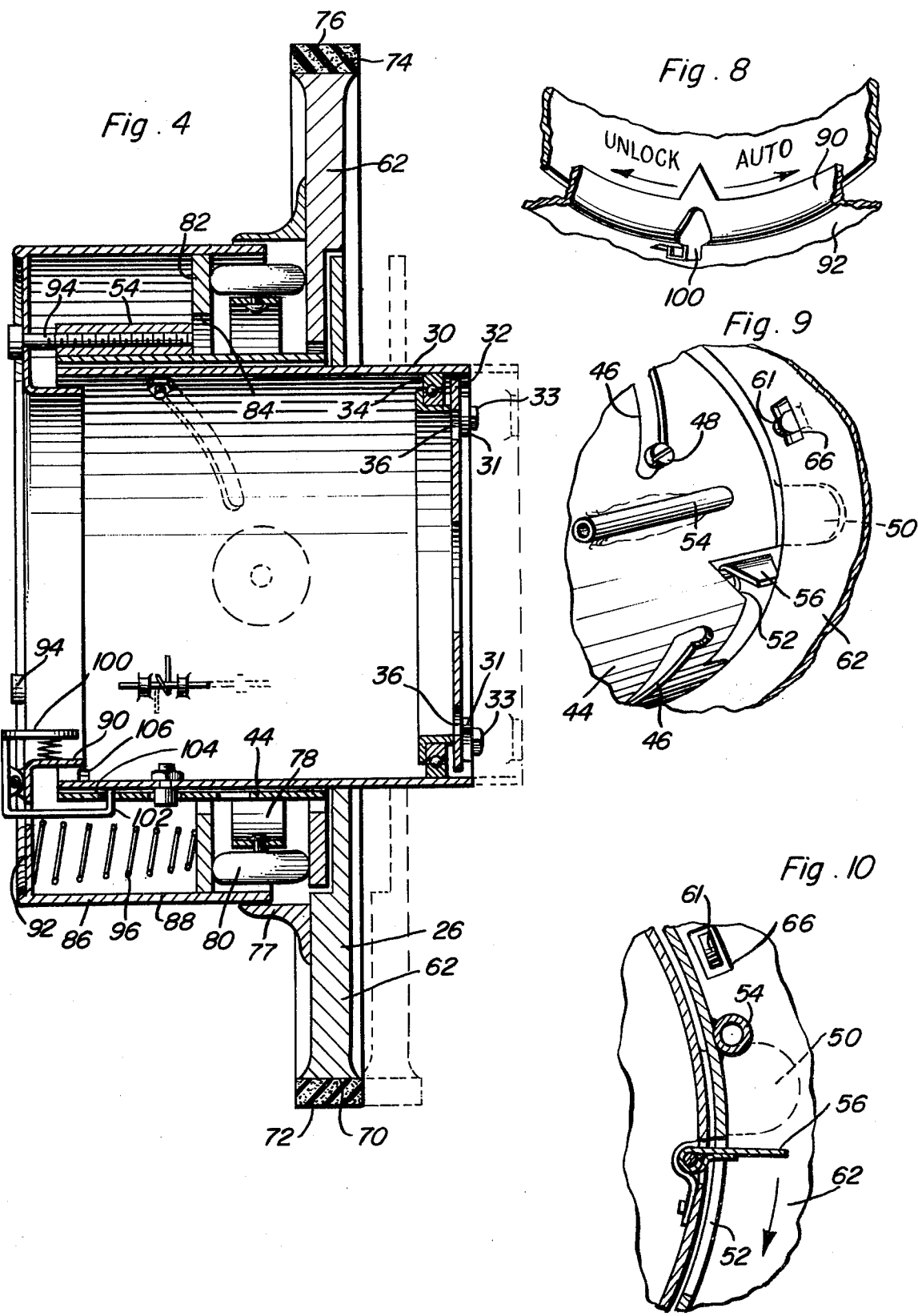
FIG. 4 is an enlarged vertical sectional view taken substantially upon the plane indicated by the section line 4—4 of FIG. 3.

After the emergency wheel 24 assumes the position illustrated in FIG. 3 with the disc 62 locked inwardly of the tabs 56 the weight 110 may be slid along and disposed in the other end of the slot 112.

In the event the conventional wheel bearings are "frozen" tight, the bearing 34 is capable of journaling the wheel 24, from the hub 32 and thereby serves the function of the frozen wheel bearing. However, the body 30 includes peripherally spaced inwardly projecting apertured tabs 31 overlying the inner surface of the hub 32 in slightly spaced relation relative thereto and the hub 32 has threaded bores (not shown) formed therethrough with which the apertured tabs 31 are registerable. If relative rotation between the hub 32 and body 30 is not desired, threaded fasteners 33 may be secured through the tabs 31 and in the hub 32 to thereby releasably lock the hub 32 and body 30 together. The fasteners 33 would, of course, be used in the event the emergency wheel 24 is to be used in conjunction with one of the drive wheels of the associated vehicle.

The Foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the ivention.

What is claimed as new is as follows:

1. For use in conjunction with a vehicle wheel of the type including a center portion mounted on a vehicle hub by fasteners secured through the central portion and supported from the hub, an emergency wheel defining a center axis thereof and including a first portion having means adapted for removable support from said central portion with said center axis substantially centered relative to said central portion and including a first radially outwardly projecting partial circular flange segment, a second portion, mounting means mounting said second portion on said first portion for rotation and shifting relative thereto about and along said axis between first and second relatively rotated and shifted positions, said second portion including a second radially outwardly projecting partial circular flange segment, said segments being disposed in axially spaced overlapped positions in axial registry with each other when said first and second portions are in said first positions and in positions out of axial registry with each other and disposed in a single plane normal to said axis and together forming a substantial continuous disc concentric with said axis when in said second positions, and means operative to releasably lock said first and second portions in said second positions.

2. The combination of claim 1 wherein said first and second segments include arcuate outer edges, the angular extent of the outer edge of said second segment being greater than the angular extent of the outer edge of said first segment.

3. The combination of claim 1 wherein said mounting means includes means mounting said second portion on said first portion for automatic shifting of said second portion along said axis relative to said first portion in response to relative rotation of said first and second portions, said first and second portions each including central hub portions, said means operative to releasably lock said first and second portions in said second positions comprising at least one axially projecting abutment carried by one of the said first and second portions and an axially opening recess defined by the other of said first and second portions in which said abutment is receivable when said first and second portions are in said second positions to lock said first and second portions against relative rotation.

4. The combination of claim 3 wherein said means operative to releasably lock said first and second portions in said second positions also includes means operative to lock said central hub portions against relative axial separation.

5. The combination of claim 3 wherein said means operative to releasably lock said first and second portions in said second positions includes means yieldingly biasing said second portion hub portion axially toward the hub portion of said first portion.

6. The combination of claim 5 wherein said one portion includes a plurality of said abutment spaced circumferentially about said axis at different radial distances from said axis, said other portion including an equal number of said recesses similarly spaced about and from said axis and concentric axially facing annular surfaces through which said recesses open, said abutments being slidingly engageable with said annular surfaces.

7. The combination of claim 6 wherein said abutments and recesses are similarly unequally spaced about said axis.

8. The combination of claim 1 wherein said first portion includes a central hub portion, the first mentioned means comprising a plurality of large and small diameter openings formed through said central hub portion spaced about and equally from said axis, said openings being arranged in a conventional wheel lug pattern and a plurality of washers for disposition over said large diameter openings, the latter being adapted to receive conventional lug nuts or heads therethrough.

9. The combination of claim 8 wherein said first and second segments include arcuate outer edges, the angular extent of the outer edge of said second segment being greater than the angular extent of the outer edge of said first segment.

10. The combination of claim 9 wherein said mounting means includes means mounting said second portion on said first portion for automatic shifting of said second portion along said axis relative to said first portion in response to relative rotation of said first and second portions, said first and second portions each including central hub portions, said means operative to releasably lock said first and second portions in said second positions comprising at least one axially projecting abutment carried by one of said first and second portions and an axially opening recess defined by the other of said first and second portions in which said abutment is receivable when said first and second portions are in said second positions to releasably lock said first and second portions against relative rotation.

11. The combination of claim 1 wherein said first portion includes a center hub portion including the first mentioned means and a second disc portion journaled from the center hub portion for rotation relative thereto about an axis coinciding with said center axis, said first flange segment being carried by said disc portion, said mounting means mounting said second portion from said disc portion, and means operative to releaseably lock said disc portion against rotation relative to said center hub portion.

* * * * *